United States Patent [19]

Sakata

[11] Patent Number: 5,883,723
[45] Date of Patent: Mar. 16, 1999

[54] FACSIMILE COMMUNICATION CONTROL METHOD IN A MOBILE COMMUNICATION SYSTEM

[75] Inventor: Masayuki Sakata, Tokyo, Japan

[73] Assignee: NEC Corporation, Tokyo, Japan

[21] Appl. No.: 684,056

[22] Filed: Jul. 19, 1996

[30] Foreign Application Priority Data

Aug. 1, 1995 [JP] Japan .................................. 7-196285

[51] Int. Cl.⁶ .............................. H04N 1/32; H04N 1/00; H04B 1/00
[52] U.S. Cl. .......................... 358/442; 358/434; 358/435; 358/436; 358/468; 455/69; 455/70; 455/557
[58] Field of Search .................................. 358/400, 405, 358/410, 411, 434, 435, 436, 439, 442, 468; 455/69, 70, 557; 379/100.01

[56] References Cited

U.S. PATENT DOCUMENTS 5,041,917  8/1991  Koshiishi ................................. 358/434
5,105,423  4/1992  Tanaka et al. ........................... 358/439
5,369,501  11/1994 Wilson et al. ........................... 358/400
5,491,565  2/1996  Naper ....................................... 358/434

FOREIGN PATENT DOCUMENTS 8-214133  8/1996  Japan .

OTHER PUBLICATIONS by Standard RCR–STD27D of Research and Development Center for Radio Systems (RCR) "Personal Digital Cellular Telecommunicaton System", pp. 315, 329 and 330.

*Primary Examiner*—Kim Yen Vu
*Assistant Examiner*—Kimberly A. Williams
*Attorney, Agent, or Firm*—Young & Thompson

[57] ABSTRACT

A facsimile communication control method is provided for a mobile communication system whereby a sending-side facsimile device capable of sending and receiving facsimile signals does not discontinue a telephone call despite completion of facsimile communication, and a receiving-side facsimile device capable of sending and receiving facsimile signals discontinues a telephone call upon completion of facsimile communication.

4 Claims, 4 Drawing Sheets

FACSIMILE COMMUNICATION CONTROL METHOD IN A MOBILE COMMUNICATION SYSTEM

BACKGROUND OF THE INVENTION

1. Field of the Invention

The present invention relates to a facsimile communication control system in a mobile communication system that includes: a mobile station composed of a mobile unit for controlling radio lines for mobile communication, a facsimile device that can transmit and receive facsimile signals, and an adapter that connects the mobile unit and facsimile device; a mobile communication exchange that accommodates this mobile station by way of radio lines; and a supplementary exchange device connected to this mobile communication exchange that controls facsimile communication through a prescribed protocol according to facsimile communication process requests from the mobile station.

2. Description of the Related Art

FIG. 1 is a block diagram showing a typical mobile communication system that performs facsimile communication. FIG. 1 presents a case in which the facsimile devices of each of two mobile units connected by way of a mobile communication network are connected and facsimile communication is performed reciprocally between the two facsimile devices, but a case may also be considered similarly in which a mobile communication network is used on only the transmitting side or receiving side.

Mobile station 1 (2) is composed of mobile unit 13 (23) that controls radio lines for mobile communication; facsimile device 11 (21) capable of transmitting and receiving facsimile data; and mobile unit-facsimile connection adapter (hereinbelow referred to as "connection adapter") 12 (22) for connecting facsimile device 11 (21) to mobile unit 13 (23).

Radio base stations 35 and 36, which control radio lines for mobile unit communication, are controlled by mobile communication radio line control stations 33 and 34, respectively. Mobile communication exchanges 31 and 32 are connected to each other by way of inter-station line 43, and in addition, accommodate mobile stations 1 and 2 by way of mobile communication radio line control stations 33 and 34 and radio base stations 35 and 36, respectively, and switch/connect mobile communication calls to mobile stations 1 and 2. Supplementary exchange devices 37 and 38 are connected to mobile communication exchanges 31 and 32, respectively, and control facsimile communication based on a prescribed transmission control protocol in response to initiation at the time of facsimile communication. Radio lines 41 and 42 connect radio base stations 35 and 36 to mobile units 13 and 23, respectively.

Operation of a prior-art mobile communication system will next be explained with reference to FIG. 2. FIG. 2 is a sequence chart from the midpoint to the end of a facsimile transmission from facsimile device 11 to facsimile device 21 between mobile stations. This sequence is a protocol proposed by Standard RCR-STD27C of the Research and Development Center for Radio Systems (RCR) and is based on call control protocol for facsimile communication employing facsimile devices in mobile communication.

Facsimile device 11, which has at this point completed transmission of image signal Pix, sends DCN indicating completion of facsimile communication to connection adapter 12, thus completing facsimile transmission by facsimile device 11. After completing transmission of Pix to supplementary exchange device 37, connection adapter 12, which has received DCN, sends DCN to supplementary exchange device 37, and executes an OFF request to mobile unit 13. After receiving DCN, supplementary exchange device 37 completes transmission of Pix to supplementary exchange device 38, following which it sends DCN to supplementary exchange device 38.

Supplementary exchange device 38, having received DCN from supplementary exchange device 37, completes transmitting Pix to connection adapter 22 and then sends DCN to connection adapter 22. Connection adapter 22 having received DCN, completes sending Pix to facsimile device 21 and then sends DCN to facsimile device 21 and executes an OFF request to mobile unit 23, thereby completing facsimile reception by facsimile device 21.

Mobile unit 13, having received the OFF request, sends INFO indicating non-speech completion to mobile communication exchange 31. Mobile communication exchange 31, having received this INFO, transmits INFO indicating current inactivity to mobile unit 13, and mobile unit 13 and mobile communication exchange 31 resume conversation.

DISC, which is a call-disconnect signal, is then sent by mobile unit 13 to mobile communication exchange 31, following which mobile communication exchange 31 both sends DISC to mobile communication exchange 32 and sends REL indicating the release of the telephone call to mobile unit 13, and when RELCOM indicating completion of release of the telephone call from mobile unit 13 to mobile communication exchange 31 has been transmitted, the telephone call between mobile unit 13 and mobile communication exchange 31 is released.

Mobile communication exchange 32, having received DISC from mobile communication exchange 31, sends DISC to mobile unit 23. Mobile unit 23 transmits REL, and when RELCOM is transmitted from mobile unit 13 to mobile communication exchange 31, the telephone call between mobile unit 13 and mobile communication exchange 31 is released.

The facsimile communication from facsimile device 11 to facsimile device 21 is thus completed.

In the above-described mobile communication system, the problem occasionally occurs that, if the transmitting-side facsimile device terminates facsimile transmission when Pix reception at the receiving-side facsimile device is delayed due to some reason such as poor line quality, the telephone call is discontinued midway even though the receiving-side facsimile device is still in the process of receiving, thereby disrupting the facsimile communication process at the end of the facsimile communication.

The reason for this problem can be explained by means of the example shown in FIG. 3.

As in FIG. 2, this figure shows a sequence chart from the midpoint to completion of facsimile communication between mobile stations from facsimile device 11 to facsimile device 21, the transmission procedure on the transmitting side being the same as in FIG. 2.

In this case, when the transmission of Pix between supplementary exchange device 38 and connection adapter 22 is delayed for some reason, mobile communication exchange 32 receives DISC from mobile communication exchange 31 during Pix transmission, whereupon mobile communication exchange 32 sends DISC to mobile unit 23, and, having received DISC, mobile unit 23 sends REL to mobile communication exchange 32 and facsimile communication is terminated midway by turning connection adapter 22 OFF.

SUMMARY OF THE INVENTION

The object of the present invention is to provide a facsimile communication control method of a mobile communication system that enables reliable facsimile communication until completion of a call.

To achieve this object, in the mobile communication system facsimile communication control method according to the present invention, a transmission-side facsimile device capable of sending and receiving facsimile signals does not discontinue a telephone call despite termination of facsimile communication, and a receiving-side facsimile device capable of sending and receiving facsimile signals discontinues a telephone call upon completion of a facsimile communication.

In specific terms, according to the facsimile communication control method in a mobile communication system of the present invention, a transmission-side facsimile device sends DCN indicating completion of facsimile communication to its own connection adapter upon completion of transmission of picture signal Pix; the connection adapter, having received DCN, completes transmission of Pix to the supplementary exchange device of its own mobile station and then sends DCN to the supplementary exchange device and executes an OFF request to the mobile unit of its own mobile station; the supplementary exchange device, having received DCN, completes Pix transmission to the counterpart supplementary exchange device and then sends DCN to the counterpart supplementary exchange device; the mobile unit, having received an OFF request, sends INFO indicating completion of a non-speech call to its own mobile communication exchange, but its own mobile communication exchange postpones transmission of INFO indicating current inactivity until completion of facsimile communication at the receiving-side facsimile device.

Accordingly, a telephone call is not released simply by the completion of transmission by the sending-side facsimile device, but rather, by completion of reception by the receiving-side facsimile device, thereby allowing a reliable facsimile communication process to completion even in the event of delays in Pix reception due to such factors as poor line quality on the receiving side.

The above and other objects, features, and advantages of the present invention will become apparent from the following description with references to the accompanying drawings which illustrate examples of the present invention.

DETAILED DESCRIPTION OF THE PREFERRED EMBODIMENTS

Figure 1:
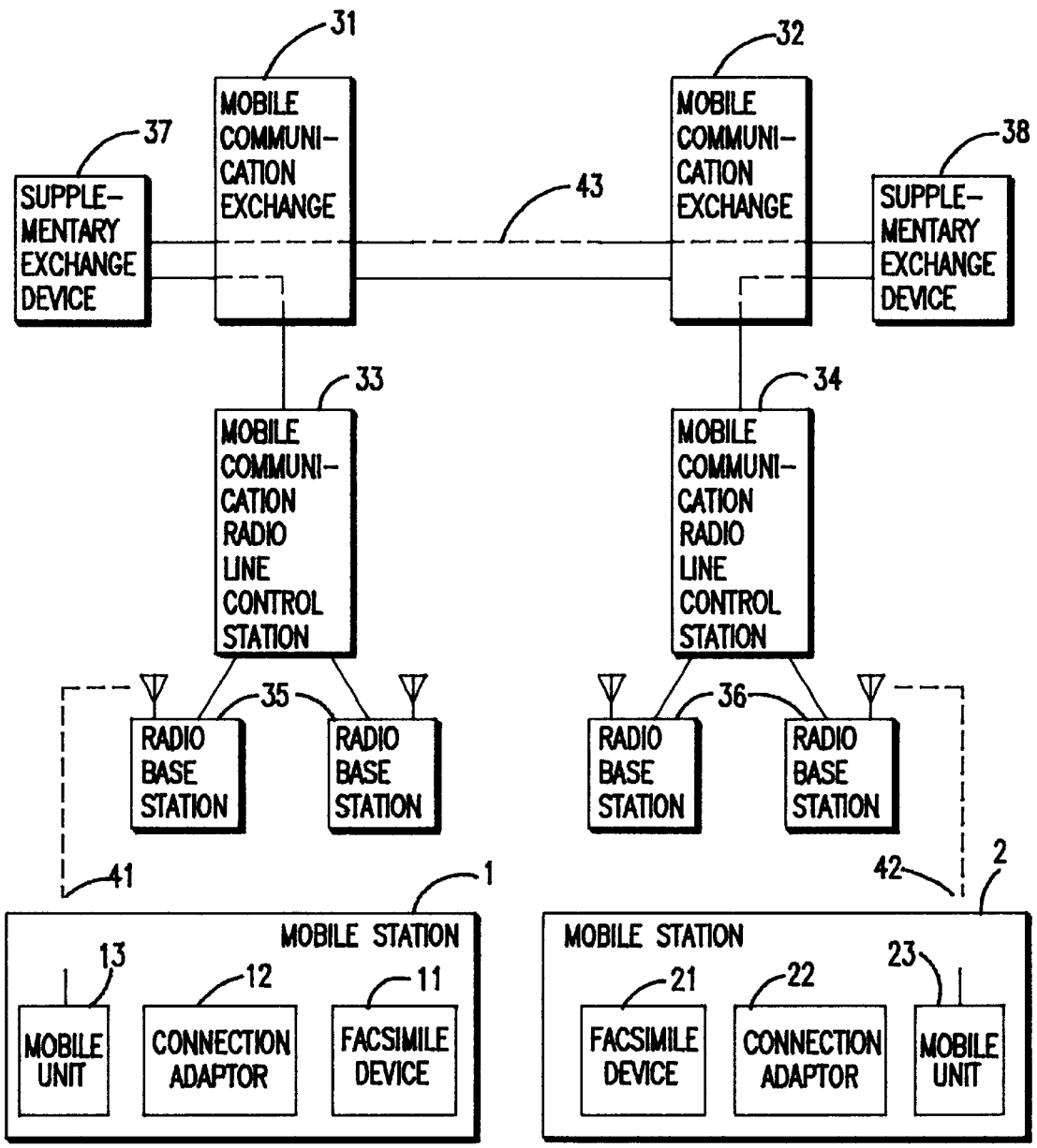
FIG. 1 is a block diagram of a typical mobile communication system.
Figure 2:
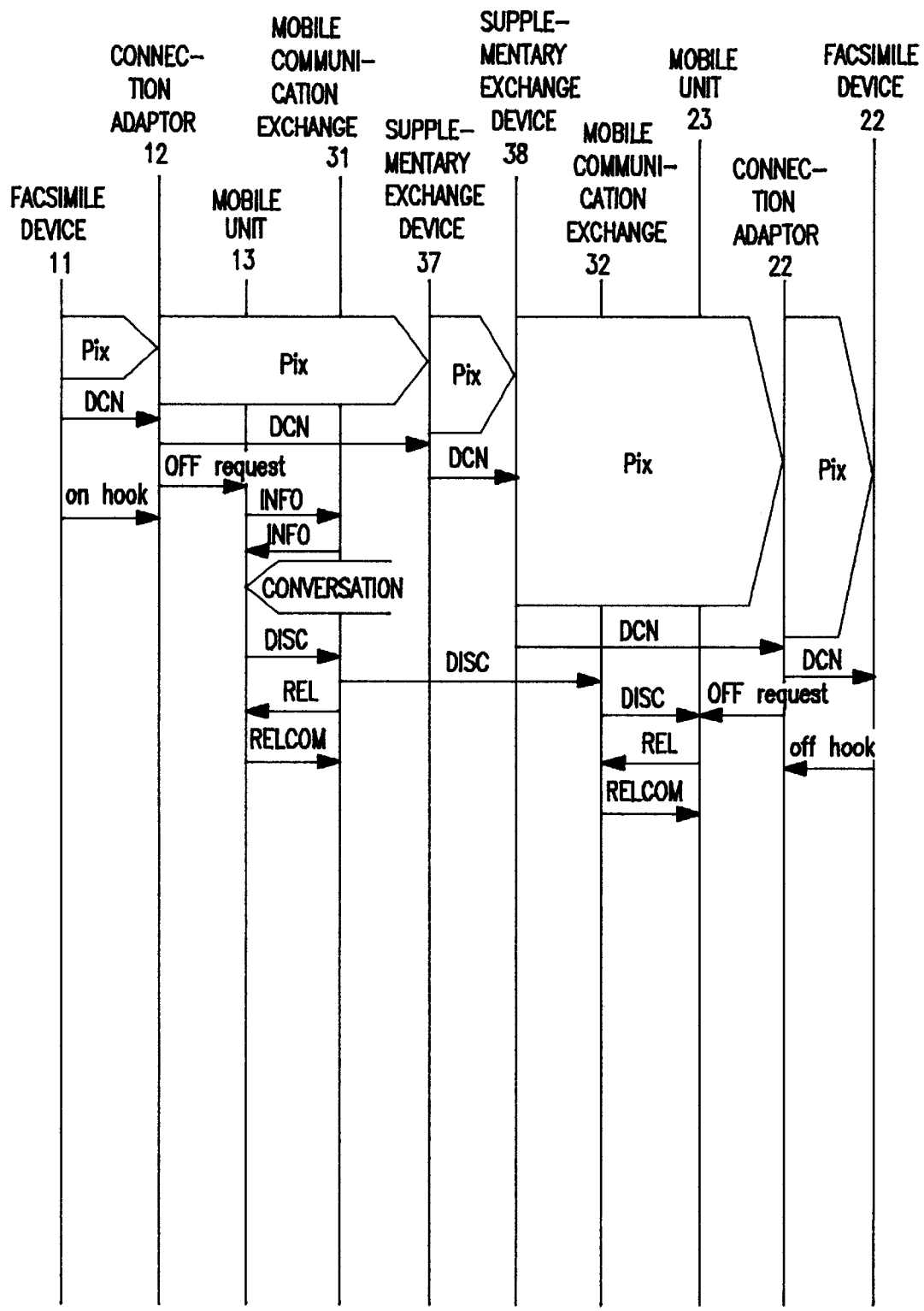
FIG. 2 is a chart showing the sequence from the midpoint to completion of a facsimile transmission in a mobile communication system of the prior art.
Figure 3:
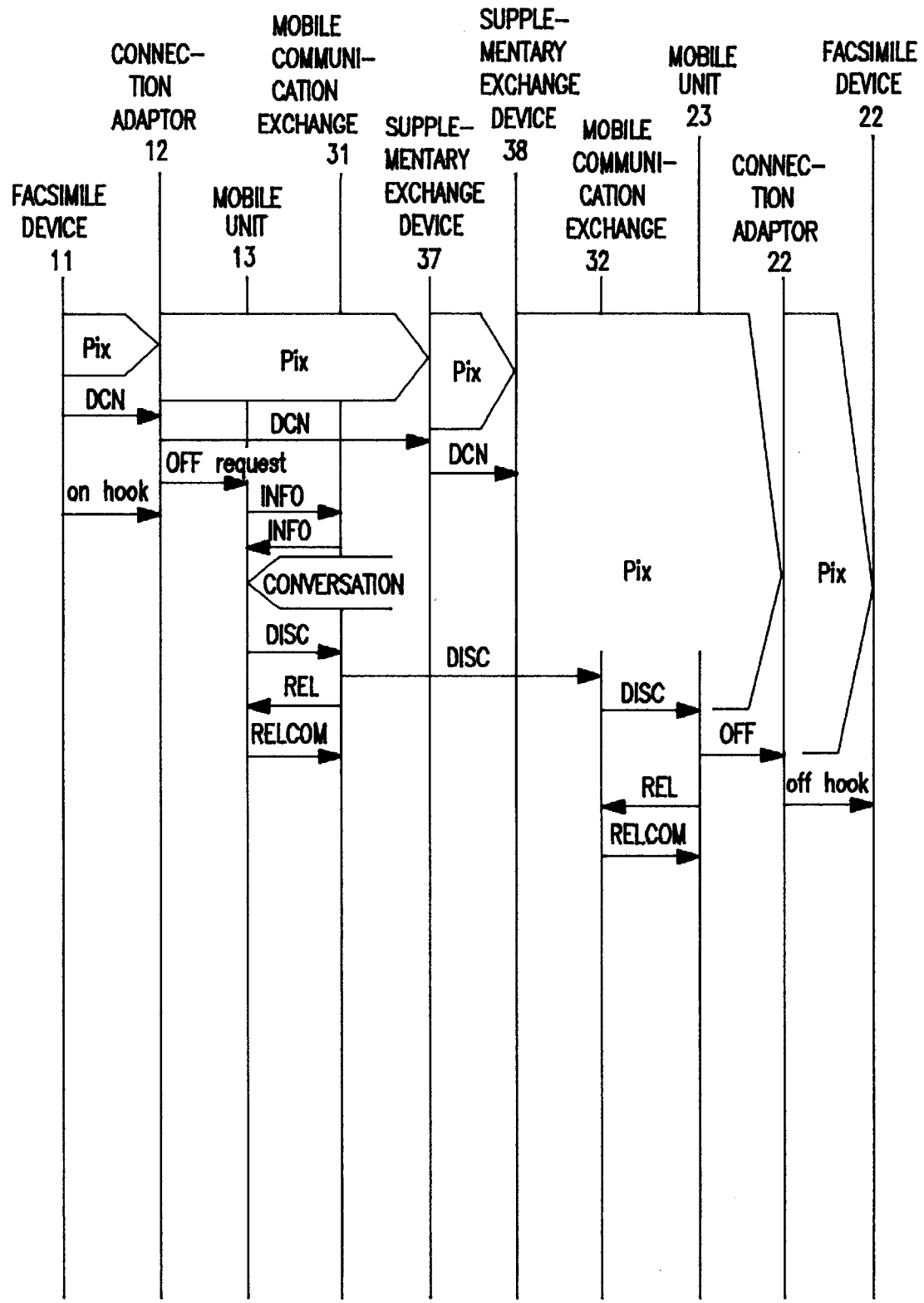
FIG. 3 is a chart showing the sequence from the midpoint to completion of a facsimile transmission in another mobile communication system of the prior art.
Figure 4:
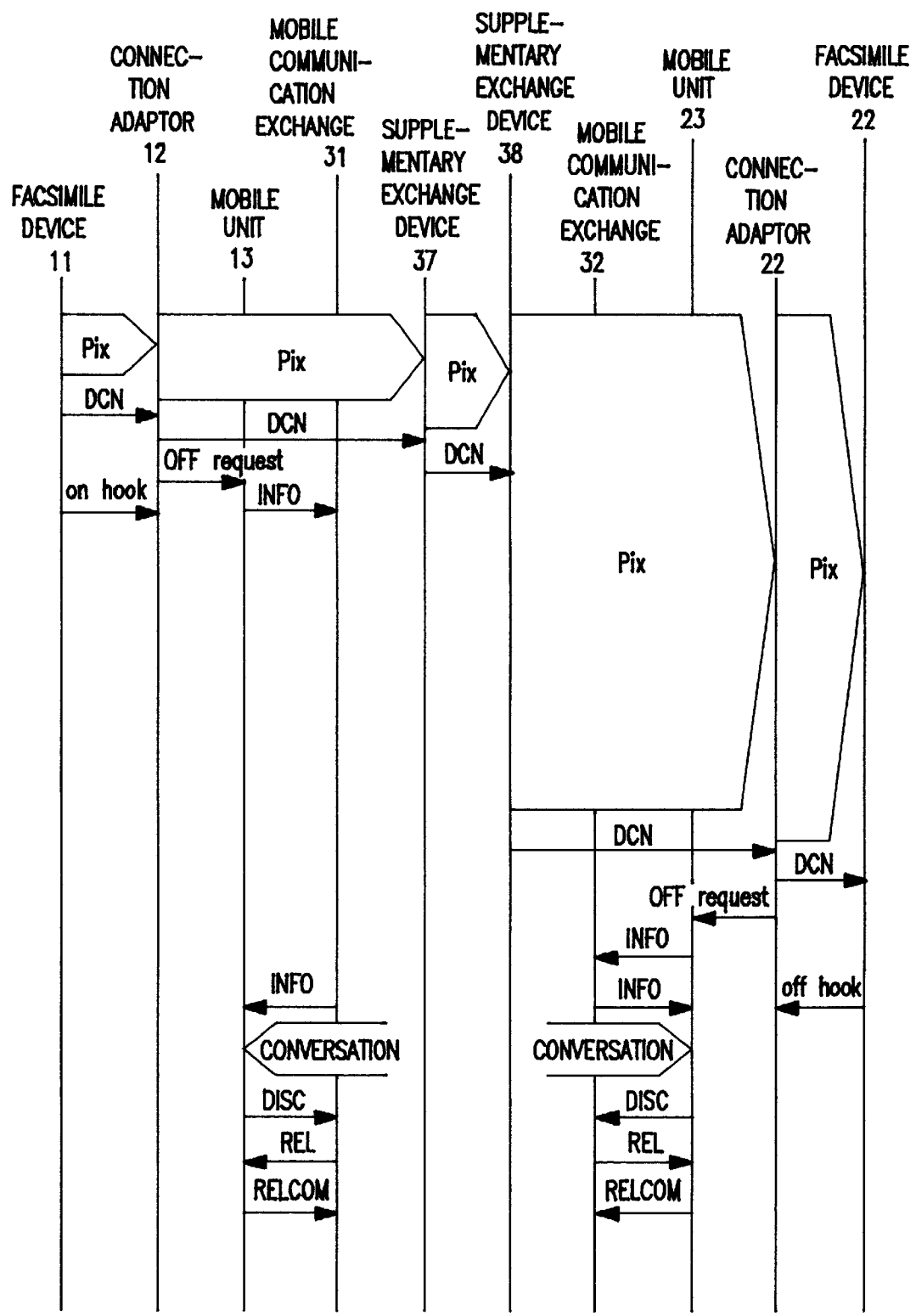
FIG. 4 is a chart showing the sequence from the midpoint to completion of a facsimile transmission in a mobile communication system of the present invention.

FIG. 4 presents one example of the sequence from the midpoint to completion of a facsimile transmission between mobile stations in a mobile communication system in which the present invention is applied. This system has the same component construction as explained hereinabove (see FIG. 2) but a case may also be similarly considered in which a mobile communication network is employed on the sending or receiving side.

Here, facsimile device 11, which has completed transmission of Pix, sends DCN to connection adapter 12, thereby completing facsimile transmission by facsimile device 11. Connection adapter 12, having received DCN, completes transmission of Pix to supplementary exchange device 37 and then sends DCN to supplementary exchange device 37 and executes an OFF request to mobile unit 13. Supplementary exchange device 37, having received DCN, completes transmission of Pix to supplementary exchange device 38 and then sends DCN to supplementary exchange device 38.

Mobile unit 13, having received OFF request, sends INFO indicating completion of a non-speech call to mobile communication exchange 31, but mobile communication exchange 31 postpones transmission of INFO indicating current inactivity until completion of facsimile communication by facsimile device 21.

Here, regardless of delays due to causes such as poor line quality in transmission of Pix between supplementary exchange device 38 and connection adapter 22, supplementary exchange device 38 is able to transmit Pix to connection adapter 22 to completion and then send DCN. Connection adapter 22, having received DCN, completes transmission of Pix to facsimile device 21 and then sends DCN to facsimile device 21 and executes an OFF request to mobile unit 23.

Mobile unit 23, having received the OFF request, transmits INFO indicating completion of non-speech with respect to mobile communication exchange 32; mobile communication exchange 32, having received this INFO, sends INFO indicating inactivity to mobile unit 23; mobile communication exchange 31 sends INFO indicating inactivity to mobile unit 13; and conversation is resumed between mobile unit 13 and mobile communication exchange 31 and between mobile unit 23 and mobile communication exchange 32.

The telephone call is then released between mobile unit 13 and mobile communication exchange 31 and between mobile unit 23 and mobile communication exchange 32 and the facsimile communication can be completed as normal.

While preferred embodiments of the present invention have been described using specific terms, such description is for illustrative purposes only, and it is to be understood that changes and variations may be made without departing from he spirit or scope of the following claims.

What is claimed is:

1. A facsimile communication control system comprising:
   sending and receiving mobile facsimile stations, each comprising a facsimile device connected through a connection adapter to a mobile unit capable of radio communication;
   a mobile communication exchange associated with each said mobile station, each said mobile communication exchange being capable of radio communication with its associated mobile station, the mobile communication exchanges also being capable of radio communication with one another; and
   a supplementary exchange device connected to each said mobile communication exchange, the supplementary exchange device controlling facsimile communication through a prescribed protocol according to facsimile communication processing requests from the associated mobile station;
   wherein the sending facsimile station does not discontinue a telephone call carrying a facsimile transmission, and wherein the receiving facsimile station discontinues the telephone call, thereby terminating all current radio communication between the mobile stations and the mobile communication exchanges on both the sending and receiving sides, said termination occurring only upon completion of the facsimile transmission to the receiving facsimile device, said termination being performed using radio messages sent from the receiving mobile facsimile station to the sending mobile facsimile station through the sending and receiving mobile communication exchanges.

2. The facsimile communication control system of claim 1, wherein the call is discontinued only upon the receiving connection adapter completing communication with the receiving facsimile device and indicating such completion to the receiving mobile unit, the receiving mobile unit then indicating communication completion to the receiving mobile communication exchange, the receiving mobile unit then indicating completion of communication to the sending mobile unit through the receiving mobile communication exchange and the sending mobile communication exchange.

3. The facsimile communication control system of claim 2, wherein the receiving connection adapter discontinues the telephone call by supplying a DCN message to the receiving facsimile device and then supplying an OFF request to the receiving mobile unit, the receiving mobile unit then sending an INFO message indicating completion of non-speech to the receiving mobile communication exchange, which then replies with another said INFO message indicating inactivity to the receiving mobile unit, which is followed by a resumed conversation between the sending and receiving mobile units through the sending and receiving mobile communication exchanges, thereby allowing each said mobile unit and its associated said mobile communication exchange to terminate communication therebetween.

4. A facsimile communication control method for use with mobile sending and receiving facsimile stations, each comprising a facsimile device connected through a connection adapter to a mobile unit capable of radio communication, the mobile sending and receiving facsimile stations communicating through a mobile communication exchange associated with each said mobile station, each said mobile communication exchange being capable of radio communication with its associated mobile station, the mobile communication exchanges also being capable of radio communication with one another, a supplementary exchange device being connected to each said mobile communication exchange, the supplementary exchange device controlling facsimile communication through a prescribed protocol according to facsimile communication processing requests from the associated mobile station, the method comprising the steps of:

sending a picture signal Pix from the sending facsimile device to the receiving facsimile device through the sending connection adapter, the sending and receiving supplementary exchange devices, and the receiving connection adapter;

sending a DCN signal from the sending facsimile device to the receiving facsimile device through the sending connection adapter, the sending and receiving supplementary exchange devices, and the receiving connection adapter;

sending an OFF request from the receiving connection adapter to the receiving mobile unit;

sending an INFO message indicating completion of non-speech from the receiving mobile unit to the receiving mobile communication exchange;

sending an INFO message indicating inactivity from the receiving mobile communication exchange to the receiving mobile unit;

resuming a conversation between the receiving and sending mobile units through the receiving and sending mobile communication exchanges; and terminating telephone communication between the sending and receiving facsimile stations, thereby terminating all current radio communication between the mobile stations and the mobile communication exchanges for both the sending and receiving facsimile stations.

\* \* \* \* \*